United States Patent [19]

Gambardella

[11] 3,805,924

[45] Apr. 23, 1974

[54] REAR DISC BRAKE WITH INTEGRAL BALL RAMP PARKING

[75] Inventor: Cosimo B. Gambardella, South Bend, Ind.

[73] Assignee: The Bendix Corporation, South Bend, Ind.

[22] Filed: Jan. 31, 1973

[21] Appl. No.: 328,215

[52] U.S. Cl................ 188/72.6, 188/71.9, 188/72.7, 188/106 F
[51] Int. Cl............................................. F16d 55/26
[58] Field of Search ....... 188/72.6, 72.7, 72.9, 71.9, 188/106 F

[56] References Cited
UNITED STATES PATENTS

| | | | |
|---|---|---|---|
| 3,243,016 | 3/1966 | Swift............................. | 188/72.7 X |
| 3,638,763 | 2/1972 | Laverdant...................... | 188/72.6 |
| 3,653,470 | 4/1972 | Travis............................. | 188/71.9 |
| 3,701,400 | 10/1972 | Burnett et al.................. | 188/72.6 |

Primary Examiner—George E. A. Halvosa
Attorney, Agent, or Firm—Ken C. Decker; William N. Antonis

[57] ABSTRACT

A disc brake is disclosed which includes both a hydraulic service actuator and a mechanical parking or emergency actuator. The brake includes a caliper which defines a stepped bore therewithin, and a pair of coaxial members mounted, along with the hydraulic piston, in the larger diameter portion of the bore. A pin extends transversely across the bore through both of the members. One of the members is provided with a longitudinal slot which receives the pin, locking the one member against rotation relative to the bore, but permitting relative axial movement therebetween. The other member is provided with an arcuate slot, preventing the latter from moving axially, but permitting rotation of the other member through a predetermined arc. The other member is stepped to define a shoulder thereon which faces the shoulder provided on the bore. Camming means are disposed between the members, so that, when the other member is rotated, the one member is urged into engagement with the piston and thereafter the one member and the piston are urged as a unit in a brake-applying direction, the forces generated by the brake application being transmitted through the members to the shoulder on the housing.

7 Claims, 2 Drawing Figures

REAR DISC BRAKE WITH INTEGRAL BALL RAMP PARKING

BACKGROUND OF THE INVENTION

This invention relates to a mechanical actuator for a disc brake.

The advantages of disc brakes have been well known to automotive engineers for a number of years. However, disc brakes to date have largely been used exclusively on the front wheels of an automotive vehicle, the more conventional drum brakes still being generally used on the rear wheels. Of course, it would be desirable to use disc brakes on all four wheels, since the disc-front/drum-rear arrangement requires expensive proportioning and metering valves, in addition to perpetuating the inherent disadvantages of the drum brakes on the rear wheels. Largely, disc brakes have not been used on the rear wheels of the vehicle because automobiles must be provided with a mechanical actuator for emergency and parking use, and heretofore parking actuators for disc brakes have been relatively ineffective and very expensive.

SUMMARY OF THE INVENTION

Therefore, an important object of my invention is to provide a mechanical actuator for a disc brake at a cost competitive with existing braking systems.

Another important object of my invention is to design a mechanical actuator for a disc brake which may be incorporated in existing disc brake housings without increasing significantly the over-all size of the latter.

Still another important object of my invention is to provide a parking actuator for a disc brake having adequate effectiveness to permit the latter to be used in nearly all vehicles manufactured in this country.

Still another object of my invention is to reduce the cost of a parking actuator for disc brakes, by designing such an actuator that may be manufactured and assembled at a minimum cost.

DETAILED DESCRIPTION

Figure 1:
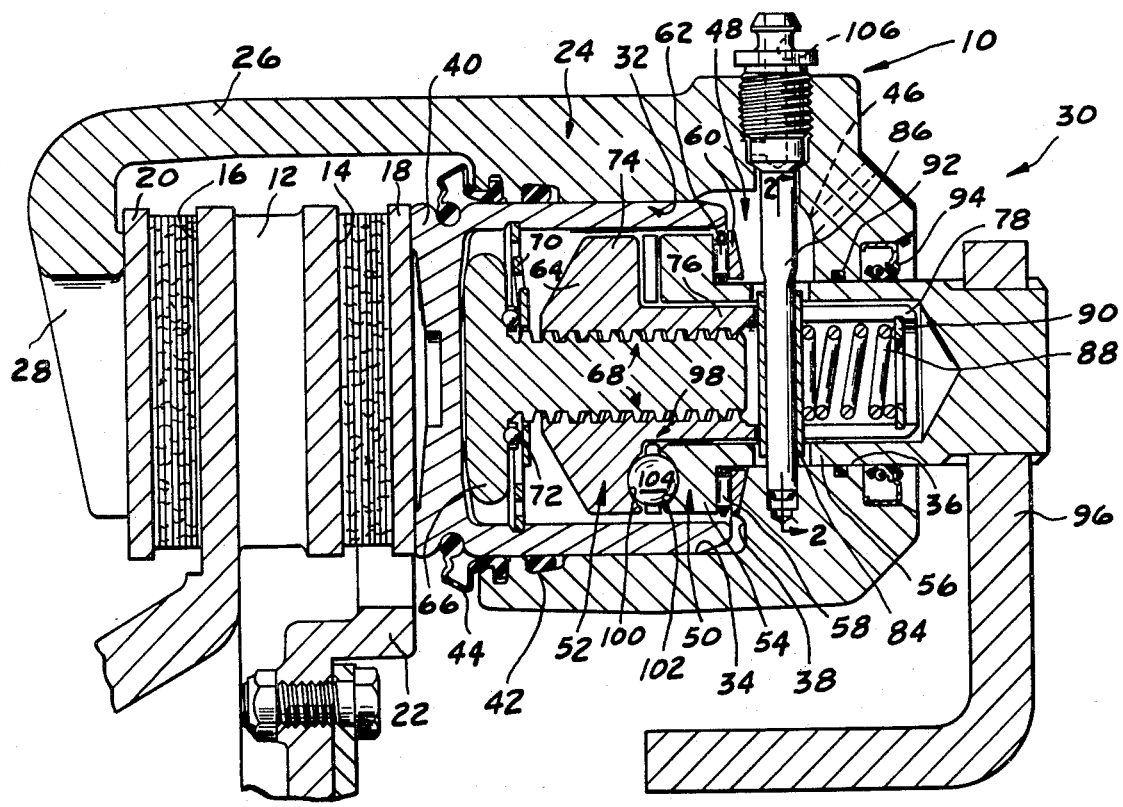
FIG. 1 is a longitudinal cross-sectional view of a disc brake made pursuant to the teachings of my present invention.
Figure 2:
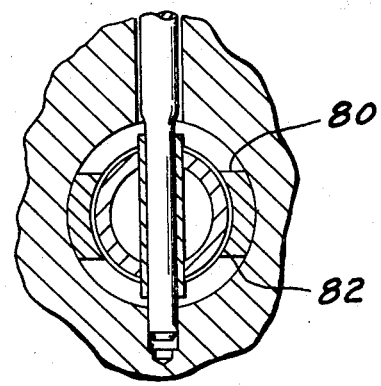
FIG. 2 is a fragmentary, cross-sectional view taken substantially along lines 2—2 of FIG. 1.

Referring now to the drawings, a disc brake generally indicated by the numeral 10 includes a rotor 12, which is mounted for rotation with the member to be braked, and which has a pair of friction faces 14 and 16. Friction elements 18, 20 are disposed adjacent the friction faces 14 and 16 and are adapted to frictionally engage the latter when a brake application is effected. A torque taking member 22 is mounted on a nonrotative portion of the vehicle adjacent the friction face 14, and slidably supports a caliper generally indicated by the numeral 24 for movement generally parallel to the axis of rotation of the rotor 12. The caliper 24 may be mounted to the torque member 22 in any suitable way well known to those skilled in the art, such as in the manner disclosed in copending Patent application Ser. No. 99,791, filed Dec. 21, 1970, owned by the assignee of the present invention and incorporated herein by reference. The caliper 24 includes a bridge portion 26 which extends across the periphery of the rotor 12, a radially inwardly extending portion 28 which extends generally parallel to the friction face 16 and engages the friction element 20, and a fluid motor portion generally indicated by the numeral 30 which is disposed adjacent the friction element 18 and extends generally parallel to the friction face 14. The fluid motor portion 30 defines a stepped bore 32 therewithin which includes a larger diameter portion 34 and a smaller diameter portion 36 with a shoulder 38 therebetween. A piston 40 is slidably mounted in the larger section 34 of the bore 32, and a seal 42 which is carried in the bore not only seals the piston against the wall of the bore but also provides a retractile force on the piston when the brakes of the vehicle are released, as more completely described in U. S. Pat. No. 3,377,076, owned by the assignee of the present invention and incorporated herein by reference. A conventional boot 44 extends between the caliper 24 and the piston 40, to prevent contaminants from entering the bore 32. An inlet port 46 is connected with an outlet port of the vehicle's master cylinder (not shown), so that, when the latter is actuated in the normal way to generate braking pressure, the braking pressure is communicated into the bore 32 for operating the piston 40 to effect a braking application.

A mechanical actuator generally indicated by the numeral 48 includes a pair of coaxial members 50 and 52. Member 50 is stepped to present a larger diameter portion 54 which is disposed in the larger portion 34 of the bore 32, a smaller portion 56 which is rotatively supported in the smaller portion 36 of the bore 32, and a shoulder 58 therebetween which faces the shoulder 38 on the housing. A wedge 60 and bearing race 62 are disposed between the shoulders 58 and 38, so that the member 50 may be easily rotated with respect to the caliper 24. The member 52 comprises a pair of extendible elements 64, 66 which are threadedly engaged with one another through the threads generally indicated by the numeral 68. The threads 68 are designed in a manner well known to those skilled in the art and are provided with the proper helix angle and pitch so that the element 66 will rotate with respect to the member 64 and thereby extend from the latter due to the threaded connection between the same, when an axially directed force is applied to the member 66 in a direction toward the rotor 12. A spring washer 70 extends radially inwardly from the piston 40, and engages a bearing 72 which is carried by the element 66. The resiliency of the washer 70 is such that, upon movement of the piston 40 toward the rotor 12 in excess of the predetermined amount, a force will be applied to the element 66 through the bearing 72 sufficient to cause it to rotate with respect to the element 64, and thereby extend from the latter. Therefore, when the brake is released, the piston 40 will retract only until it engages the element 66, which has been extended from the element 64. Therefore, retraction of the piston 40 upon release of the brake is limited to a predetermined amount, thereby maintaining the clearance between the friction elements 18 and 20 and their corresponding friction faces 14 and 16 substantially constant. Of course, the spring washer 70 will yield to limit the maximum force applied to the element 66 if the piston 40 is driven toward the rotor 12 with a force greater than the yield point of the washer 70.

The element 64 includes a larger diameter portion 74 which is disposed in the section 34 of the bore 32, and a smaller diameter portion 76 which is received within the smaller diameter portion 56 of the member 50. The portion 76 is provided with a longitudinally extending slot 78 which receives a sleeve 84. Similarly, the portion 56 of the member 50 is provided with arcuately extending slots 80, 82 which also receive the sleeve 84. A pin 86 extends transversely across the bore 32 through the sleeve 84 and is secured to the wall of the bore at opposite sides of the latter, thereby preventing movement of the sleeve 80 within the bore 32. Because of the engagement of the longitudinal slots 78 with the sleeve 80, the member 52 may move axially toward and away from the rotor 12 within the bore 32, but may not rotate relative to the caliper housing 24. On the other hand, because of the arcuate slots 80 and 82 in portion 56 of the member 50, the latter is locked against axial movement within the caliper, but may rotate relative to the latter through a predetermined arc. A spring 88 extends between the pin 84 and a retainer 90 carried by the element 74, so that the member 52 is urged as a unit to the right viewing FIG. 1, away from the rotor 12.

As illustrated in FIG. 1, the rightwardmost end of the member 50 extends from the caliper 24, and is sealed against the latter by a conventional hydraulic seal 92 and boot 94. A lever 96 is secured to the member 50 and the lever 96 is connected to the parking actuator in the vehicle operator's compartment by an appropriate linkage (not shown).

Camming means generally indicated by the numeral 98 are disposed between the larger diameter portions 74 and 54 of the members 52 and 50, respectively. Camming means 98 includes a first recess 100 in the member 52 and a second recess 102 in the member 50. A sphere 104 is disposed between the members 50 and 52, such that it extends into both the recess 100 and the recess 102. While only one set of recesses 100, 102 and only one sphere 104 are illustrated in the drawing, it should be noted that any number of elements 98 may be provided between the members 50 and 52, and the same are spaced circumferentially around the elements 50 and 52, as is more clearly illustrated in U. S. Pat. No. 3,701,400, owned by the assignee of the present invention and incorporated herein by reference.

MODE OF OPERATION

When a service brake application is effected, fluid pressure generated in the aforementioned master cylinder is communicated into the bore 32 through the inlet port 46 where it acts on the piston 40, driving the latter to the left viewing FIG. 1. The movement of the piston 40 urges the friction element 18 into frictional engagement with the friction face 14, and because of the slidable connection between the caliper 24 and torque member 22, reaction forces transmitted through the bridge portion 26 will also urge the friction element 20 into braking engagement with the friction face 16. Therefore, a brake application is effected. Of course, as described hereinabove, if wear of the friction elements 18, 20 should necessitate movement of the piston 40 toward the rotor 12 in excess of a predetermined amount, a force transmitted through the resilient washer 70 and the bearing 72 will exert an axially directed force on the element 66. Because of the threaded connection between the element 64 and 66, the axial force exerted on the element 66 causes the latter to rotate and therefore extend from the element 64. Therefore, when the brakes of the vehicle are released, the piston 40 can retract only until it engages the element 66, and therefore retraction of the piston 40, and the release clearance between the friction elements 18, 20 and their corresponding friction faces 14, 16, is limited to a predetermined amount. It should be noted that the spring constant of the washer 70 is less than that of the spring 88, so that during a normal hydraulic actuation in which the piston 40 moves relative to the element 66 the spring 88 is in no way deflected. Should sufficient force be generated on the piston 40 to deflect the spring 88, the washer 70 first deflects, thereby preventing deformation of the spring 88.

When a mechanical actuation is effected, such as a parking or emergency application, the appropriate control in the vehicle driver's compartment is manipulated to rotate the lever 96, thereby rotating the member 50, it being remembered that the arcuate slots 80 and 82 permit rotation of the member 50, while the member 52 is held against rotation by the longitudinal slot 78. As the member 50 is rotated, the recess 102 is moved out of alignment with the recess 100, thereby urging the sphere 104 up the walls of the recesses 100, 102 to thereby exert a camming action on the member 52, driving it axially within the bore 32 to the left viewing FIG. 1. Of course, the member 50 is held against axial movement within the bore 32 by the engagement of the sleeve 84 with the arcuate slots 80 and 82, while movement of the member 52 axially within the bore is permitted by the longitudinal slots 78. As the member 52 moves away from the member 50, it first engages the piston 40 and thereafter the piston 40 and member 52 move as a unit, to urge the friction element 18, and therefore the friction element 20, into frictional engagement with their corresponding friction faces 14 and 16. The braking torque generated by this frictional engagement is transmitted back through the piston 40 and the elements 52 and 50 to the shoulder 38 of the housing, and thereby all braking forces are taken directly by the caliper housing 24 itself, in much the same way that caliper housing 24 absorbs all braking forces during a hydraulic actuation.

Whenever the parking or emergency application is released, the lever 96 is rotated back to the brake release position, thereby again aligning the recesses 100 and 102. The spring 88 then urges the element 64 back to the brake release position, as illustrated in the drawings.

It should be noted that the mechanism 48 may be quite easily manufactured and installed within the caliper 24. The members 50 and 52 may be assembled with the sleeve 84 holding them together, before the mechanical actuator 48 is inserted in the caliper 24. After the latter is installed on the caliper 24, the pin 86 is driven through the sleeve 84, thereby holding the latter against rotation within the bore 32, to thereby also hold the members 50 and 52 in their proper place. The pin 86 may also be provided with a bleed passage 106, so that it may function as a bleed screw in the normal manner well known to those skilled in the art when the vehicle's braking system is bled.

I claim:

1. In a disc brake:
   a rotor having a pair of friction faces;
   a pair of friction elements, one of said elements being disposed adjacent each of said friction faces;

a torque member mounted adjacent one of said friction faces;

a caliper slidably mounted on said torque member and straddling said rotor, said caliper being operably connected to each of said friction elements and adapted to urge the latter into braking engagement with said friction faces when a brake application is effected;

said caliper defining a stepped bore therewithin having larger and smaller sections with a shoulder therebetween;

hydraulic actuating means including a piston slidably mounted in said larger section and responsive to fluid pressure to move toward said rotor to actuate said caliper to effect a brake application; and mechanical actuating means including a pair of members, means holding one of said members against rotation relative to the housing, means for rotating the other member, said other member being stepped to present larger and smaller diameter portions with a shoulder therebetween, the larger portion of said other member being disposed in said larger section of said bore with the shoulder on said other member facing the shoulder on said bore, and camming means disposed between said members so that upon rotation of said other member said camming means drives the one member and said piston away from the other member and toward the rotor to effect a brake application, the braking forces generated by said brake application being transmitted through said members and said piston to said shoulder on said bore;

said members being coaxial to present an inner member and an outer member, said means holding said one member against rotation including stop means carried by said housing extending through said members to prevent rotation of said one member while preventing axial movement of the other member and limiting the arc of rotation of the latter;

said stop means being a pin extending transversely across said bore and through said members, the one member having a longitudinal slot receiving said pin whereby said one member is locked against rotation relative to the bore but is permitted to move axially within the latter, the other member having circumferentially extending slots receiving said pin whereby said other member is locked against axial movement within said bore but is permitted to rotate within the latter through a predetermined arc.

2. The invention of claim 1:
resilient means yieldably urging said one member toward said shoulder, said resilient means extending between said one member and said pin.

3. The invention of claim 1:
said one member comprising axially extendible elements extending in response to movement of said piston toward the rotor in excess of a predetermined amount during hydraulic actuation of said brake whereby upon release of the hydraulic actuation retraction of said piston is substantially limited to a predetermined distance.

4. The invention of claim 3:
first resilient means yieldably urging said one member away from said rotor; and resilient means connecting the piston and said extendible elements to transmit movement of the piston in excess of the predetermined distance to extend the extendible members, the spring rate of said second resilient means being less than the spring rate of said first resilient means.

5. In a disc brake:
a rotor having a pair of friction faces;
a pair of friction elements, one of said elements being disposed adjacent each of said friction faces;
a torque member mounted adjacent one of said friction faces;
a caliper slidably mounted on said torque member and straddling said rotor, said caliper being operably connected to each of said friction elements and adapted to urge the latter into braking engagement with said friction faces when a brake application is effected, said caliper defining a bore therewithin;

hydraulic actuating means including a piston slidably mounted in said bore and responsive to fluid pressure to move toward said rotor to actuate said caliper to effect a brake application; and mechanical actuating means including coaxial members comprising an inner member and an outer member, stop means carried by said housing and extending transversely across said bore and through said members, one of said members being provided with a longitudinal slot receiving said stop means whereby said one member is locked against rotation relative to the bore but is permitted to move axially within the latter, the other member having circumferentially extending slots receiving said stop means whereby said other member is locked against axial movement within said bore but is permitted to rotate within the latter through a predetermined arc, and camming means disposed between said members whereby upon rotation of the other member the one member is driven into engagement with the piston and thereafter said one member and said piston are driven as a unit toward said rotor to effect a brake application.

6. The invention of claim 5:
said one member comprising axially extendible elements extending in response to movement of said piston toward the rotor in excess of a predetermined amount during hydraulic actuation of said brake whereby upon release of the hydraulic actuation retraction of said piston is substantially limited to a predetermined distance.

7. The invention of claim 6:
first resilient means yieldably urging said one member away from said rotor; and
second resilient means connecting the piston and said extendible elements to transmit movement of the piston in excess of the predetermined distance to extend the extendible members, the spring rate of said second resilient means being less than the spring rate of said first resilient means.

* * * * *